United States Patent [19]

Doe, Jr.

[11] 3,846,384

[45] Nov. 5, 1974

[54] POLYMERIZATION PROCESS

[75] Inventor: Lester Adrian Doe, Jr., Newtown, Conn.

[73] Assignee: GAF Corporation, New York, N.Y.

[22] Filed: Jan. 19, 1972

[21] Appl. No.: 219,164

[52] U.S. Cl. ... 260/80.3 E, 117/139.5 A, 260/80 M, 424/71
[51] Int. Cl. ............................................. C08f 15/10
[58] Field of Search .......... 260/80 M, 80 P, 80.3 E, 260/91.1 M, 91.1 R

[56] References Cited
UNITED STATES PATENTS

| | | | |
|---|---|---|---|
| 2,980,634 | 4/1961 | Melamed | 260/2.1 |
| 3,265,675 | 8/1966 | Hagemeyer, Jr. | 260/85.5 |
| 3,397,192 | 8/1968 | Grosser | 260/80.72 |

OTHER PUBLICATIONS

Schildknecht; C. E. Vinyl and Related Polymers, Wiley & Sons, N.Y., pp. 626–628, (1952).

Primary Examiner—Joseph L. Schofer
Assistant Examiner—C. A. Henderson, Jr.
Attorney, Agent, or Firm—Walter C. Kehm; Samson B. Leavitt

[57] ABSTRACT

The invention relates to a polymerization process for the preparation of film-forming polymers which comprises contacting an acrylic compound with vinyl ether compound co-polymerizable therewith in an inert organic hydrocarbon solvent in the presence of a free radical-supplying catalyst until polymer formation occurs and recovering the polymer product thus produced.

14 Claims, No Drawings

POLYMERIZATION PROCESS

BACKGROUND OF THE INVENTION

1. Field of the Invention

This invention relates to a novel method for the preparation of synthetic polymer products and more particularly to a novel method for the production of film-forming polymers prepared by copolymerizing an α,β-ethylenically unsaturated monocarboxylic acid and a vinyl ether copolymerizable therewith.

2. Description of the Prior Art

Considerable difficulty has been encountered heretofore in connection with polymerization techniques employed for carrying out copolymerizations of α,β-ethylenically unsaturated carboxylic acids with vinyl ether compounds. To a substantial extent, such procedures are uniformly characterized by the use of aqueous polymerization media maintained under acid, basic or neutral conditions, depending upon such factors as the type of product desired, the reaction conditions, or the type of catalyst employed. The use of aqueous polymerization media has, however, proved undesirable from several standpoints, especially in connection with polymerizations based on such acrylic monomers as acrylic acid, methacrylic acid and the like.

Copolymerization of the foregoing and related materials with comonomers which yield undesirable by-products under the conditions of copolymerization have proved particularly unsatisfactory. For example, acrylic acid-vinyl ether copolymerization, when carried out in aqueous media at pH 6, have been found to lead to the formation of aldehydes which deleteriously affect such essential polymer properties as tensile strength, color and odor. Moreover, the presence of aldehydes tends to decrease the yield of polymer product thereby adding to the costs involved. Vinyl monomers, such as those typified by the vinyl ethers, undergo hydrolysis in the presence of acid, e.g., acrylic acid, with concomitant liberation of aldehyde. Various procedures have been resorted to in an effort to overcome or otherwise mitigate the foregoing situation. For example, one such suggested procedure involves as an essential manipulative step the neutralization of the acid comonomer material prior to the introduction of the vinyl ether comonomer. However, this procedure possesses the obvious disadvantage of requiring an added step, namely, acid neutralization. More importantly, the polymer product obtained as a result of this technique is found to possess, undesirably, substantial quantities of inorganic salt thereby necessitating the use of relatively complex and expensive purification treatments such as, for example, treatments based on the use of ion exchange resins.

Moreover, the use of aqueous polymerization media with comonomers of the type described above, presents the further disadvantage that the steps of the product isolation and removal are made difficult due to the fact that the polymer product is obtained in the form of a viscous aqueous solution. Accordingly, the implementation of various techniques which are invariably both costly and time consuming become necessary in order to obtain the polymer product in the desired isolated form.

It is thus an object of the present invention to provide a process for the production of copolymerizates from acrylic monomers and vinyl ether monomers copolymerizable therewith which are not subject to one or more of the above disadvantages.

It is a further object of the present invention to provide a process for copolymerizing acrylic monomers and vinyl ether monomers copolymerizable therewith which eliminates the use of aqueous polymerization media and thus the attendant problems of polymer isolation recovery and purification.

Other objects and advantages of the present invention will appear hereinafter as the description proceeds.

The polymerization process of this invention comprises contacting an acrylic compound with a vinyl ether compound copolymerizable therewith in an inert organic hydrocarbon solvent and in the presence of a free radical-supplying catalyst until polymer formation occurs. The polymer thus produced can then be recovered and purified in a simple and economical manner.

SUMMARY OF THE INVENTION

In accordance with this invention, it has been found that the copolymerizates obtained from the inter-polymerization of an acrylic monomer such as acrylic acid with a vinyl ether compound copolymerizable therewith can be produced directly in substantially pure form, e.g., essentially free of aldehydes, inorganic salts and the like undesirable impurities. These results are in marked contrast to those characterizing prior art methods.

DETAILED DESCRIPTION OF THE INVENTION

The attainment of the foregoing and related objects of this invention results from the discovery that the copolymerization of certain acrylic monomers and vinyl ether monomers copolymerizable therewith can be carried out under substantially anhydrous conditions in an inert organic hydrocarbon solvent in the presence of a free radical-supplying catalyst over a wide range of temperatures to produce thereby a polymer product of exceptional purity and quality.

Polymers produced in accordance with the present invention are substantially devoid of color and odor and can easily be deposited in the form of clear and continuous films from aqueous solutions thereof. In addition, one of the outstanding features of the present invention resides in the fact that the polymer product is produced directly and separation from the organic solvent media is thereby facilitated.

In carrying out the polymerization anhydrous conditions are preferred. The advantage of a non-aqueous solvent is that all the vinyl ether is available without loss due to hydrolysis. Hydrolysis is catalyzed by acids. Prior art methods of polymerizing acrylic acid and vinyl ethers in aqueous systems resulted in substantial aldehyde formation absent a neutralization step. In non-aqueous solvent media the subject invention eliminates the need for any neutralization step.

The acrylic type monomers found to be eminently suitable for use in the process of the present invention can be represented by the following general formula:

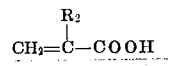

wherein $R_2$ represents hydrogen, halogen, such as chlorine, bromine, fluorine, iodine, lower-alkyl (e.g. 1–6 carbons) such as methyl, ethyl, propyl, butyl, pentyl, hexyl and the branched derivatives thereof substituted lower-alkyl, haloalkyl, wherein exemplary of the substituents are the halogens (as defined), such as chloromethyl, chloroethyl, dichloroethyl, the mono-, di-, and tri-chloropropyls, butyls, pentyls, hexyls and the bromo, iodo and fluoro analogs thereof. Examplary of compounds coming within the above formula are acrylic acid and the above defined alkyl or substituted alkyl homologs thereof, such as $\alpha$-chloroacrylic acid, $\alpha$-chloromethylacrylic acid, $\alpha$-bromoacrylic acid or $\alpha$-bromomethylacrylic acid. It will be further understood that minor proportions, e.g., up to about 10% by weight of the acrylic monomers of the foregoing formula may be reached in the form of certain functional derivatives thereof, such as the corresponding acid nitriles, amides, halides and the like.

The vinyl ethers contemplated for use in the process of the present invention are represented by the following general formula:

$$CH_2 = CH - OR_1$$

wherein $R_1$ is alkyl, such as methyl, ethyl, propyl, octyl, etc., alkenyl, alkoxyalkyl, alkenyloxyalkyl, and the like having preferably 1 to about 18 carbon atoms.

As examples of the foregoing class of compounds there may be mentioned in particular divinyl ethers, such as divinyl ether, 1,2—, 1,3— and 1,4— divinyloxybutane, 1,2—, and 1,3— divinyloxypropane; vinyl lower-alkyl ethers such as vinyl methyl ether, vinyl ethyl ether, vinyl propyl ether, etc., vinyl loweralkoxyalkyl ethers such as vinyl ethoxyethyl ether, vinyl ethoxymethyl ether, etc., vinyl lower-alkenyloxy lower-alkyl ethers such as vinyl ethenyloxyethyl ether, vinyl ethenyloxymethyl ether, and the like.

Although the present invention has been found to be particularly effective with monovinyl ether compounds, like improvement is also obtained with vinyl ether compounds, like improvement is also obtained with vinyl ether compounds containing a plurality of vinyl groups, e.g., divinyl ether.

The nature of the substituents present in either of the foregoing monomer materials is not particularly critical, the only requirement with respect thereto being that they do not interfere with the polymerization mechanism and that the properties desired in the final polymer product be not deleteriously affected thereby.

The proportions of the monomers which may be effectively employed in the polymerization method of the present invention may be varied over relatively wide limits. However, the improvements provided by the present invention are particularly manifest when monomer proportions are employed such that the final copolymer product contains from 50 to 90 mole percent of acrylic monomer units and correspondingly from 50 to 10% vinyl ether monomer units. Accordingly, it is preferred to employ monomer proportions of acrylic/-vinyl ether of approximately 1:15 to 9:1, preferably 3:1 to 6:1. Ratios less than 3:1 can be employed provided temperatures lower than 25°C., e.g., 0°C - 10°C., are used.

As pointed out above, the catalyst found to be suitable in the present invention can be described in general as those of the free radical-supplying type and may be either soluble or dispersible in the organic solvent. As examples thereof there may be mentioned the organic peroxides including diacyl peroxide such as diacetyl, dibenzoyl, and dilauroyl peroxide, dialkyl peroxide such as di-(tertiary-butyl) peroxide and hydroperoxides, such as tertiary-butyl hydroperoxide, cyclohexanylhydroperoxide and the like.

Especially valuable results have been obtained with the azo type catalysts, i.e., compounds containing the azo linkage. As examples of these materials there may be mentioned azobisisobutyronitrile, $\alpha$, $\alpha$-azobis-($\alpha$, $\gamma$-dimethylvaleronitrile) $\alpha$, $\alpha'$-azobis-($\alpha$-ethylbutyronitrile), $\alpha$, $\alpha'$-azobis-diisobutyramide, dimethyl and diethyl, $\alpha$, $\alpha'$-azobis-diisobutyrate, and the like. When temperatures below 25°C. are employed, effective free radical initiators are UV light, photosensitizers in the presence of UV light, or organic redox systems. Exemplifying such low temperature catalyst systems are azobisisobutyronitrile plus ultraviolet light; benzoyl peroxide (or lauroyl peroxide) plus dimethylaniline and thiophenol; isopropylperoxydicarbonate plus dimethylaniline or N,N-dimethyl-l-naphthylamine and thiophenol.

The amount of catalyst employed is not especially critical except as it affects the molecular weight of the desired polymer, and amounts ranging from 0.01 to about 5%, based on the weight of the monomer materials have been found to be especially suitable.

The inert organic solvents employed in the present invention are likewise not critical, except as they affect the molecular weight of the polymer, the essential requirement with respect thereto being that they remain inert under the conditions employed in the polymerization and do not adversely affect the polymer product. In general, any of the conventional and well known hydrocarbon solvents can be employed. Examples thereof are those of the aromatic series including benzene, toluene, xylene, cyclo-aliphatics including cyclohexane, cyclobutane, cyclopentane, and the like, and aliphatics, such as heptane, octane, petroleum ether and the like. Other inert solvents include N-methyl pyrrolidone, dioxane, methylene chloride, acetone, chlorobenzene, butyrolactone, N, N-dimethylacetamide.

As pointed out above, the temperature employed for the polymerization reaction is not especially critical, so long as acrylic/ether ratios of 3:1 or greater are employed, and may vary within wide limits ranging from room temperature to 90°–95°C. and higher. It is usually preferable to warm the reaction mixture to a temperature range of 50°–85°C. to initiate polymerization. However, since the polymerization reaction is exothermic and may be initiated at room temperature, it should be understood that the heat evolved during the initial stages of the polymerization reaction may well be sufficient to produce the ultimate polymerization reaction rate desired. In any event, the temperatures developed during the polymerization reaction should desirably be maintained within the limits above defined and preferably at temperatures ranging from 40° to 65°C.

The order in which the various materials comprising the reaction media are mixed, i.e., monomers, catalysts, solvent, etc., can be varied. When a higher proportion of vinyl ether is desired in the copolymer, it is preferable to add the acrylic monomer slowly to the vinyl ether-solvent-catalyst mixture.

The determination of the terminal point in the polymerization reaction can be made according to conventional methods such as spot testing to determine the presence of unreacted monomers. Moreover, since the polymer product is formed as a precipitate in the organic solvent media, the cessation of polymer formation can be used as the terminal indicator. In addition, since the polymerization reaction involved is exothermic, the polymerization end point is readily determined when heat evolution from the reaction media ceases.

The polymer product thus obtained upon completion of the polymer-forming reaction can be readily removed from the organic solvent medium, e.g., by decantation, filtering, etc., and thereafter dried to yield a translucent, stable solid, varying from hard to soft dependent upon the vinyl ether comonomer.

The polymers prepared in accordance with the present invention find utility in a wide variety of applications. As examples of the latter there may be mentioned such uses as textile sizes, e.g., for "Dacron," remoistenable adhesives, drilling mud additives, soil conditioning agents, protective colloids, in the fabrication of water soluble packaging films, as stabilizers in detergent formulations as briquette coatings, antiredeposition additives for detergent formulations, leatherfulling agents, etc., as binders in pigment coating formulations, as detackifiers for various polymer containing formulations, e.g., polyvinyl pyrrolidone in hair spray formulations. Moreover, certain of the polymers produced in accordance with the present invention are readily adaptable for extrusion into foils, fibers and the like.

The following examples in which parts are given by weight are illustrative of the present invention and are not to be regarded in any way as being limitative thereof:

EXAMPLE 1

A flask equipped with a condenser, stirrer, inlet and outlet tube each provided with a thermometer is flushed with nitrogen and charged with 74.5 parts of benzene. 15.1 parts of acrylic acid (AA) and 0.21 part of azobisisobutyronitrile are introduced with stirring. Thereafter, approximately 11.3 parts of methyl vinyl ether (MVE) are introduced and the temperature of the flask contents is increased to approximately 50°C. whereupon an exothermic reaction occurs with the formation of a polymer precipitate. A temperature of 55° to 65°C. is maintained throughout the course of the polymerization. After approximately 4 hours, there is obtained a translucent, copolymer slurry. This product is removed from the flask, filtered and dried to yield a translucent, colorless, non-tacky powder. Analysis indicates the polymer product to be essentially free of aldehyde contamination. A 1 percent solution in water at pH 7.2 showed a viscosity of 100 centipoises by use of a Brookfield viscometer.

The product is soluble in water and methanol and deposits clear continuous films from solutions thereof.

EXAMPLE 2

The apparatus is provided with an efficient condenser, stirrer, inlet and outlet tubes for nitrogen thermometers and device for submitting reactants. The apparatus is flushed with dry nitrogen and charged with 75 parts benzene, 42 parts acrylic acid and 0.21 part of azobisisobutyronitrile. MVE is introduced in the liquid phase through a graduated addition condenser or directly from the weighed cylinder containing MVE. 11.3 parts of MVE and charged. The reactants are heated to 80° at which temperature polymerization occurs. The heating is lowered since an exothermic reaction occurs. The temperature rises to 70°. After 1/2 hour the reaction is complete producing a translucent, copolymer slurry. The product is removed from the flask, filtered and dried to give a translucent colorless form stable non-tacky powder. The product was essentially aldehyde and acylal free. Clear, colorless continuous film result upon dissolving the copolymer in water or methanol and casting on a glass plate.

EXAMPLE 3

The apparatus is similar to Example 1 except a UV light source is introduced. 28 parts of MVE and 0.82 part of MVE are dissolved in 350 parts of benzene. The solution is introduced into the reaction vessel and cooled to 10°C. The UV source is turned on 36 parts of acrylic acid are dissolved in 66 parts of benzene. This acrylic acid solution is added incrementally over 2 hours to prevent an exothermic reaction. The reaction is complete after 3 hours. The reaction product is filtered and dried to a white powder. The copolymer is essentially aldehyde and acylal free. The viscosity number at 1 percent concentration benzene is 0.15.

EXAMPLE 4

Ten parts of glacial methacrylic acid is added to a flask equipped as described in Example 1 containing 76.3 parts of benzene. While the flask contents are maintained under stirring, approximately 13.2 parts of methyl vinyl ether and 0.12 parts of $\alpha, \alpha'$-azobisisobutyronitrile are added. Polymerization is allowed to proceed to substantial completion whereupon the polymer product is filtered and dried to yield a white powder. The product thus obtained yields continuous films from aqueous or alcoholic solutions thereof.

EXAMPLE 5

The procedure of Example 4 is repeated except that forty parts of glacial methacrylic acid was used. A fine white powder resulted which is substantially free of aldehyde and acylal.

EXAMPLE 6

The procedure of Example 2 is repeated except that ethyl vinyl ether is substituted for the methyl vinyl ether. The copolymer thus obtained is a stable, transparent solid substantially free to aldehyde and acylal.

EXAMPLE 7

The procedure of Example 2 is repeated except that methoxyethyl vinyl ether is substituted for the methyl vinyl ether. The copolymer thus obtained is essentially free of aldehyde and acylal and is in the form of a transparent solid.

Each of the polymer products obtained according to the foregoing examples are easily deposited in the form of continuous films from aqueous or alcoholic solutions thereof.

When the procedure described in Examples 1–4 is repeated with such vinyl ether compounds as vinyl isopropyl ether, vinyl butyl ether, vinyl isobutyl ether, vinyl octyl ether, and the like, there are obtained polymer products similar in color and purity to those described above. Again, such products are found to be substantially free of aldehyde and yield continuous films when deposited from aqueous or alcoholic solutions thereof.

This invention has been disclosed with respect to certain preferred embodiments thereof, and there will become obvious to persons skilled in the art various modifications and variations thereof which are intended to be included within the spirit and scope of this invention.

What is claimed is:

1. A polymerization process which comprises contacting an acrylic compound selected from the group consisting of acrylic acid and the alpha-alkyl homologs thereof with a under substantially anhydrous conditions of the formula $H_2C=CH-O-R_1$ wherein $R_1$ has 1 to 18 carbon atoms vinyl ether compound co-polymerizible therewith in an inert organic hydrocarbon solvent in the presence of a free radical-supplying catalyst until polymer formation occurs.

2. A process according to claim 1 wherein the acrylic compound is selected from the group consisting of acrylic acid and the $\alpha$-alkyl homologs thereof and the vinyl ether is ethyl vinyl ether.

3. A process according to claim 2 wherein the acrylic compound is acrylic acid.

4. A process according to claim 2 wherein the acrylic compound is methacrylic acid.

5. A process according to claim 1 wherein the vinyl ether is methyl vinyl ether.

6. A process according to claim 1 wherein the vinyl ether is ethyl vinyl ether.

7. A process according to claim 1 wherein the vinyl ether compound is methoxyethyl vinyl ether.

8. A process according to claim 1 wherein the inert organic hydrocarbon solvent is selected from the group consisting of aromatic, aliphatic and cycloaliphatic hydrocarbon compounds.

9. A process according to claim 5 wherein the inert organic hydrocarbon solvent is benzene.

10. A process according to claim 5 wherein the inert hydrocarbon solvent is toluene.

11. A process according to claim 5 wherein the inert organic hydrocarbon solvent is xylene.

12. A process according to claim 5 wherein the inert organic hydrocarbon solvent is cyclohexane.

13. A process according to claim 1 wherein the free radical-supplying catalyst is selected from the group consisting of organic peroxides and organic compounds containing and azo linkage.

14. A process according to claim 13 wherein the free radical-supplying catalyst is azobisisobutyronitrile.

* * * * *

UNITED STATES PATENT OFFICE
CERTIFICATE OF CORRECTION

Patent No. 3,846,384   Dated November 5, 1974

Inventor(s) Lester Adrian Doe, Jr.

It is certified that error appears in the above-identified patent and that said Letters Patent are hereby corrected as shown below:

Claim 1, line 5, after "thereof with a", insert-- vinyl ether compound copolymerizable therewith--, line 6, cancel "vinyl ether compound co-polymerizable", line 7, cancel "able therewith".

Signed and Sealed this

Twenty-fourth Day of June 1980

[SEAL]

Attest:

SIDNEY A. DIAMOND

Attesting Officer   Commissioner of Patents and Trademarks